Oct. 11, 1960 W. J. KRUPICK ET AL 2,955,472
DAMPING CONTROL MECHANISM FOR FLUID DAMPED GYROS
Filed Aug. 13, 1959 2 Sheets-Sheet 1

INVENTORS
WALTER J. KRUPICK
GUY F. CIACCO
BY
ATTORNEY

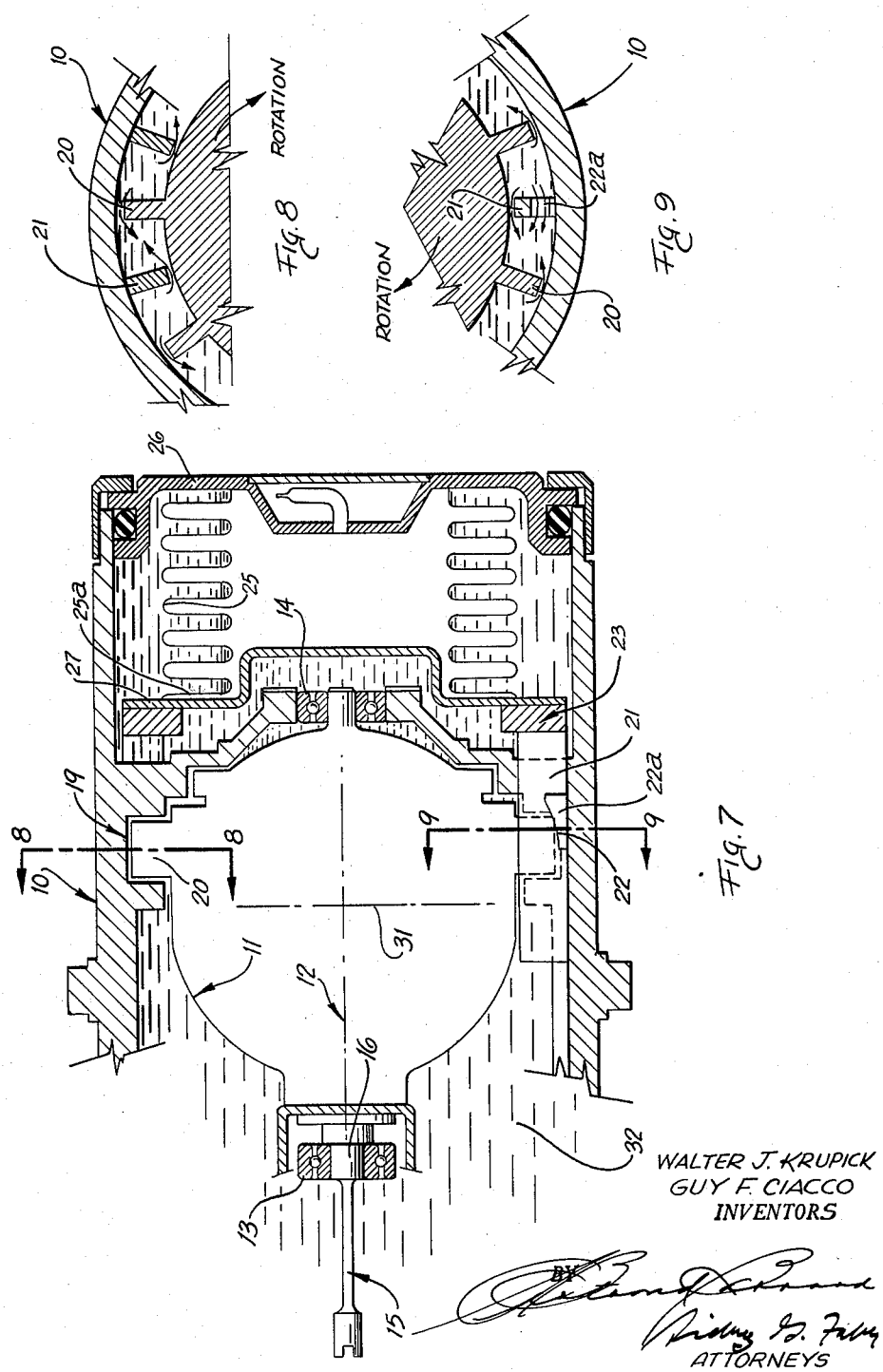

United States Patent Office 2,955,472
Patented Oct. 11, 1960

2,955,472

DAMPING CONTROL MECHANISM FOR FLUID DAMPED GYROS

Walter J. Krupick, Franklin, N.J., and Guy F. Ciacco, Bronx, N.Y., assignors to General Precision, Inc., a corporation of Delaware Filed Aug. 13, 1959, Ser. No. 833,561

11 Claims. (Cl. 74—5.5)

This invention generally relates to improvements in fluid damped gyros and is particularly concerned with a device for automatically compensating for temperature variations to maintain the viscous damping of the gyro constant.

The use of fluid suspended and damped gyros for aircraft and other applications has become widespread because of the many advantages provided by the fluid. Among others, the fluid serves as a cushion to protect the delicate gyro parts and bearings against shock and accelerations; it buoyantly floats the gyro mechanism, removing weight from the bearings and hence lessens friction, wear, and drift; and it provides a substantially ideal manner of obtaining viscous restraint. Experience has indicated that for many applications where the instrument is exposed to severe vibration (10 G's or over) and/or shock (50 G's or over) the best solution to this problem is fluid filling. However to maintain the necessary precision and dependability of the gyro, it is usually necessary that the characteristics of the fluid remain substantially constant over relatively long periods of time and despite variation in the surrounding temperature, since, for example, a change in the viscosity of the fluid with temperature undesirably varies the degree of damping. In airborne applications in particular this presents a considerable problem since the surrounding temperature may vary over a wide range, and this variation may occur quite rapidly.

Heretofore it has been a common practice to compensate for temperature variation in a direct manner, such as by enclosing the gyro instrument in a temperature compensated container or by employing electrical heating coils about the gyro together with means serving to energize the coils as needed when the surrounding temperature falls. However in airborne applications, the weight and size of the gyro are considerations of great importance and it is highly desirable to eliminate the heating coils and other such apparatus and to the extent possible, to simplify and make more dependable the gyro mechanism.

Also, it is of great importance in many military applications to have very rapid "warm-up" or "ready" time for emergencies. This short time, such as ½ or 1 minute, while sufficient to run-up a gyro motor will not allow for the use of heaters. Therefore, the use of this compensating damping mechanism eliminates the need for heaters and the need of a relatively long warm-up time of 5 to 10 minutes when the gyro is initially at the extremely low environmental temperature.

To provide this temperature compensating function according to the present invention, the temperature varying means such as heaters, as generally employed are eliminated, and instead there is provided a means for varying the effect of the damping fluid on the gyro with changes in viscosity to the end of maintaining the ultimate damping of the gyro constant. More specifically, there is provided a means in the general form of a variable orifice chamber or dashpot wherein the size of the orifice opening is automatically enlarged or made smaller in such manner that the damping of the gyro remains substantially constant over a wide range of temperature variation.

It is accordingly a primary object of the invention to provide constant fluid damping of a gyro despite wide variation in the viscosity of the fluid. Besides compensating for viscosity variations of from —30° F. to +200° F., it is also important for the damping mechanism to fully compensate for the more difficult region of —30° F. to —70° F. where there is a much more rapid change in viscosity per unit change in temperature.

Another object is to provide such constant damping by hydromechanical means.

A still further object is to automatically provide constant fluid damping of a gyro despite temperature changes by means of small, lightweight and dependable means.

Also it is important to maintain required gyro motor size at a minimum and to keep instrument errors due to friction low. For example, the use of a plunger type dashpot with its linkage attached to motor gimbal would contribute too much friction for an instrument of this size and accuracy requirements.

Other objects and many attendant advantages will be more readily comprehended by those skilled in the art after a detailed consideration of the following specification taken with the accompanying drawings wherein:

Figure 7 is an enlarged schematic longitudinal sectional view, similar to Figure 1, showing the features of operation of the apparatus.

Figure 8 is an enlarged cross-section through a portion of the damping chamber, and a portion of the blade ring, shown in Figure 1, taken on the line 8—8 of Figure 7.

Figure 9 is an enlarged cross-section, similar to Figure 8, through another portion of the damping chamber, and a portion of the blade ring, shown in Figures 1 and 3, showing an orifice through one of the blades, taken on the line 9—9, Figure 7.

Figure 1:
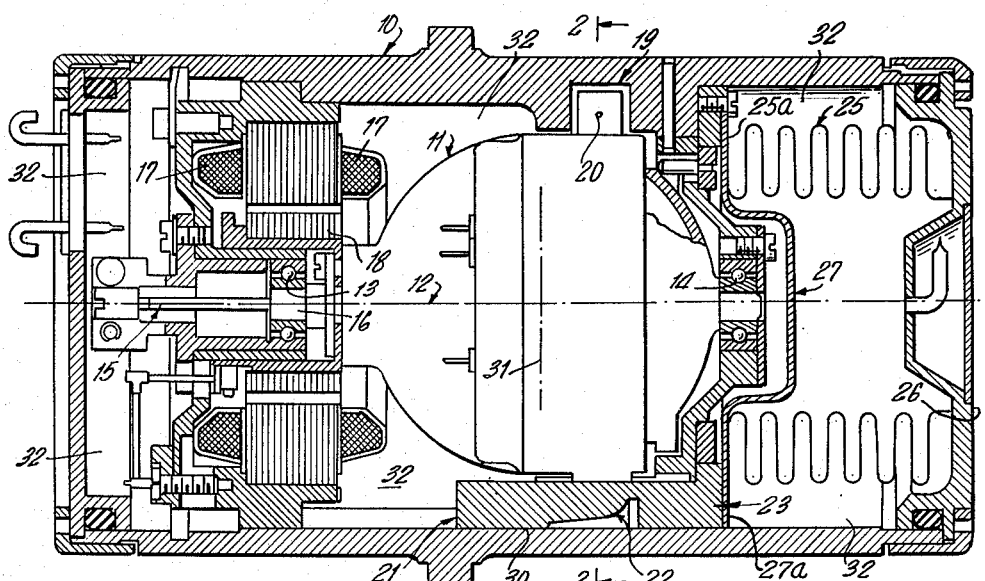
Figure 1 is a longitudinal sectional view of the preferred gyro construction according to the present invention.

Referring now to the drawings for a detailed consideration of one preferred embodiment of the invention, there is shown in Figure 1 and Figure 7, a preferred single axis floated gyro including a hollow hermetically sealed outer case 10 containing a gyro rotor housing 11 that is supported for limited rotational angular movement within the case about the single axis 12 by means of suitable bearings, such as high precision ball bearings 13 and 14, a torsion bar being provided to limit the rotational movement of the housing 11 of the gyro.

To serve as a rate gyro, the rotor housing 11 is restrained by suitable spring means, such as a torsion bar 15, interconnecting the shaft 16 fastened at the left of housing 11 with a frame rigidly supported by the outer case. The torsion bar 15 is preferably designed to operate at relatively low torsional stresses and permit limited rotative movement of the housing 11 thereby insuring low hysteresis effects and linear variation of the spring restraining force with rotative movement.

To obtain an electrical signal proportional to the rotative displacement of the gyro housing 11 with respect to a given zero or null position, there is provided a suitable signal generator or pickoff means generally designated 17, and, as shown in Figure 1, being comprised of an annular inductive winding rigidly supported by the case 10 and a coaxially disposed inductive member 18 within the winding 17 and being fastened for rotation with the gyro rotor housing 11.

The gyro rotor housing 11 internally supports a gyro rotor (not shown) that is spinning at high speed about an axis perpendicular to the plane of Figure 1. Rotation of outer case 10 about the input axis 31 as shown in Figures 1 and 7, results in a relative rotative displacement between the gyro rotor housing 11 and the outer case by gyroscopic action. However the torsion bar connection 15 between the case and rotor housing 11 effects a displacement therebetween proportional to the rate of return about axis 31. As well known to those skilled in the art, rotational movements of the case 10 about the input axis 31 result in a torque and displacement of the gyro about its single degree of freedom axis 12 and consequently the gyro may be mounted in any desired position that correctly orients its spin axis in a direction to measure the desired angular velocity.

As generally discussed above, the case 10 is hermetically sealed and is filled with a fluid, such as a rubbery silicone composition or the like, generally designated 32. This fluid serves a number of important functions such as providing a cushion to protect the relatively delicate gyro parts against shock, vibration and rapid acceleration, as well as buoyantly suspending the gyro to remove considerable weight from the bearings and thus reduce the bearing friction and wear to a minimum. In addition, the fluid is employed in a most important manner to provide a viscous restraining force or damping of the gyro rotor housing 11 to obtain the desired rate gyro characteristics.

Figure 5:
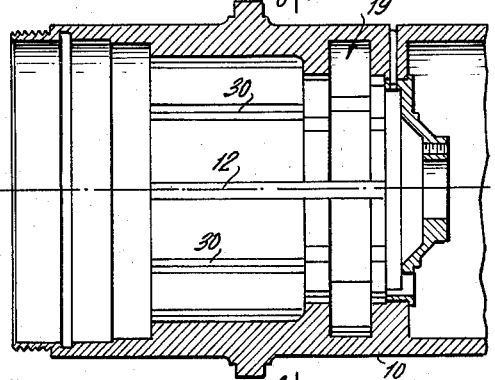
Figure 5 is a longitudinal section similar to Figure 1 showing the interior of the outer case or housing to which the sliding adjustment ring shown in Figure 3 is fitted.

To effectively provide this damping function, the outer case 10 is formed with an annular recessed portion generally designated 19 in Figure 1 and Figure 5 communicating with the interior of the case 10 and the gyro rotor housing 11 is provided with a plurality of outstanding vanes or paddles 20 projecting radially therefrom and being uniformly spaced about the outer surface of gyro rotor housing 11 to project into the recess 19.

Radial clearance is always maintained between the paddles 20 of the motor housing and the annular recessed portion 19, of the case 10 at all times.

The annular recess 19 containing the paddles or vanes 20 opens into the interior of the case 10, as shown in Figure 1 and consequently is filled with the silicone fluid 32 thereby immersing the vanes 20. Rotative movement of the gyro rotor housing 11 about axis 12 thus moves the vanes 20 in the silicone fluid to damp or viscously restrain such rotative movement of the rotor housing 11.

To effectively control the fluid damping operating against the vanes 20, there is provided means for forming substantially closed damping chambers about each of the vanes 20, with each chamber having a variably sized orifice opening therethrough that may be made smaller or larger to increase or decrease the damping on the vanes.

Figures 2, 3:
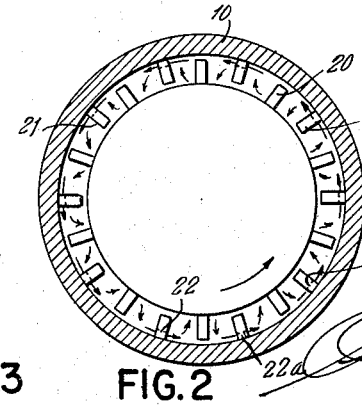
Figure 2 is a cross-section taken through lines 2—2 of Figure 1.
Figure 3 is a partial longitudinal section through a portion of the gyro shown in Figures 1 and 2, for illustrating the orifice contour on each blade of a sliding adjustment blade ring, shown in Figure 4.
Figure 4:
Figure 4 is an enlarged side elevation and section through one of the blades shown in Figure 3 for illustrating the configuration of the blades of the orifice blade ring.

As best shown in the schematic cross-section of Figure 2 and also in Figure 7, the means for forming the variable orifice chambers about the vanes 20 preferably comprises a slidable adjustment unit, including a plurality of equally spaced blade members 21 concentrically disposed about the interior of recess 19 and each being interposed between a pair of vanes 20. Thus a pair of such blades 21 effectively sandwich each vane 20 to provide a substantially closed damping chamber thereabout. As shown in Figure 1 and more clearly in the enlarged view of Figure 4, each of the blades 21 is preferably formed with a slotted opening portion 22 formed therethrough that progressively increases in size in a predetermined manner along the length of the blades. This slotted opening 22 forms with the interior wall of the case 10 an orifice opening into each of the damping chambers about the vanes 20. Consequently as the blade 21 is moved lengthwise into the recess 19, the size of this orifice opening is varied from a substantially fully closed position when the blade is positioned at the far right in Figure 1 to a position providing a large leakage orifice opening when the blade is at the far left in Figure 1.

As best shown in Figure 3, all of the blades 21 are preferably connected to or integral with a common ring member 23 and accordingly may be positioned in unison further into or out of the recess 19 to simultaneously control the size of the orifice openings 22a controlled by slotted portions 22, through each of the damping chambers.

According to the present invention there is provided a means for automatically positioning said sliding adjustment unit, including blades 21 longitudinally along the case 10 according to changes in the temperature of the fluid 32 thereby to vary the area of the passages through which the fluid is circulated and maintain the fluid damping on the vanes 20 constant despite variations in the viscosity of the fluid with temperature. To obtain this automatic control there is provided within the case 10 a gas filled longitudinally expandable bellows 25 with the right-hand end thereof bearing against an end wall 26 of the case 10 and with the left-hand end or front wall 25a thereof bearing against a cap 27 which engages the outer face of and is attached to the ring member 23 that controls the lengthwise positioning of the sliding adjustment unit and the blades 21.

Actually the end wall 25a of the bellows is soldered or otherwise fixedly attached to the annular flange. The annular flange 27a of the cap is in turn attached to the ring 23 of the sliding adjustment unit thereby directly connecting the end wall of the bellows 25 to the sliding adjustment unit and the blades 21 thereof.

The front wall 25a of bellows 25 and the outer surface of the annular flange of the cap 27, to which the front wall of the bellows is fitted, are in direct contact with the damping fluid 32 within the case and therefore the bellows 25 assume an expanded or contracted position corresponding to the expansion and contraction of the damping fluid 32. If the temperature of the damping fluid rises, the damping fluid 32 expands and its volume increases thereby serving to contract the bellows by pushing its front wall 25a to the right in Figure 1. This reduces the radial height of the fluid passage area from the bottom of the slotted portion of the blades 21 to the inner circumference of the housing and restricts the flow of fluid around the paddles 20. Since the bellows' front wall 25a is connected to the annular flange of the cap 27, which is attached to the ring 23, the contraction of the bellows draws the ring 23 to the right and therefore positions all of the blades 21 to the right. Movement of blades 21 to the right reduces the size of the slotted openings 22a formed by the slotted portion of the blades, that are located within the annular recess 19, thereby providing smaller orifice openings in the damping chambers about each of the damping vanes 20. If the viscosity of the damping fluid 32 were constant, this action would serve to increase the fluid damping on the vanes 20. However, since an increase in temperature lowers the viscosity of the fluid, the net result is to maintain the fluid damping substantially constant despite the increase in temperature.

Similarly if the temperature of the outer case and fluid 32 contained therein should fall, the volume of the fluid 32 likewise is reduced, and the gas-filled bellows 25 is permitted to expand as the gas pressure in the interior of the bellows is relatively constant. An expansion of the bellows moves its front wall 25a to the left in Figure 1 and correspondingly positions the sliding adjustment unit and the blades 21 to the left thereby enlarging the size of the orifice openings 22a in each damping chamber about the gyro housing vanes 20. Since a reduction in temperature also increases the viscosity of the damping fluid, and the decrease in temperature operates to enlarge the orifice openings 22a, the net result is also to maintain the damping substantially constant.

Thus it is observed that despite increases or decreases in the temperature of the damping fluid 32, accompanied by like variations in its viscosity, the hydromechanical damping means of the present invention operates to maintain the damping of the gyro substantially constant. It is to be particularly noted that the variation in size of the slotted openings 22a formed in each of the blades 21 is preferably made to conform with the change of viscosity of the fluid 32 with changes in temperature as well, as the characteristics of the bellows 25 whereby the fluid damping of the gyro may be maintained substantially constant over a wide range of temperature variation. In one preferred embodiment of the invention, by way of example, the regulating means are designed to correct or compensate for a temperature variation in a silicone oil fluid ranging from about −65° F. to +185° F.

Figure 6:
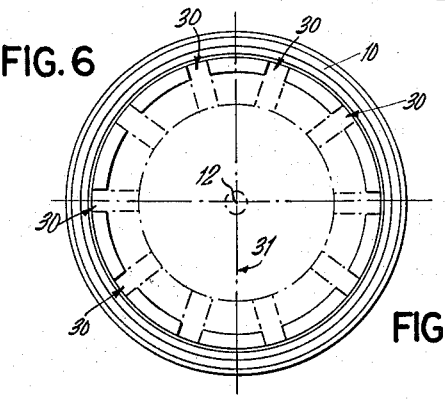
Figure 6 is a cross-section through the housing along lines 6—6 of Figure 5.

Figures 5 and 6 illustrate details of a preferred construction of the outer case 10 to enable the blades 21 to slide lengthwise through the annular recessed opening 19 as directed by expansion and contraction of the bellows 25. As shown there is provided a plurality of longitudinally disposed parallel-sided slots 30, formed in the inner wall of the case 10, and one for each of the blade members 21. The slots 30 form channels or guideways lengthwise of the case to enable reciprocal movement of the blades 21 as directed by expansion and contraction of the bellows 25, and the shoulders of these guideways in cooperation with the slotted portions of the blades form the orifice openings 22a through each of the chambers as discussed above.

Thus, according to the present invention there is provided means for maintaining substantially constant fluid damping in a fluid filled gyro despite temperature variation and consequently viscosity variation, over a wide range without the need for heating or cooling means or heat insulating means, all serving to maintain the temperature of the fluid constant. This invention is therefore to be particularly contrasted with those known devices which seek to maintain constant temperature conditions in a gyro as a means of insuring constant fluid damping since the present invention allows the temperature of the damping fluid to vary with surrounding temperatures and atmospheric conditions in which the gyro is operated and corrects for such variation by increasing or decreasing the rate of circulation through controlled areas, and therefore maintains substantially constant the effectiveness of the damping fluid.

In order to enable a complete understanding of the present invention, numerous specific examples are set forth. It is understood however that the invention is not limited thereto, and such modifications and variations as are embraced by the spirit and scope of the appended claims are contemplated as being within purview of the present invention.

What is claimed is:

1. In a fluid damped gyro, a housing for enclosing the gyro and containing the damping fluid, control means providing substantially constant viscous damping on the gyro despite wide variations in the temperature of the damping fluid, said control means including a plurality of vanes projecting substantially radially from the gyro housing and into the fluid, and including movable partitioning forming a plurality of chambers within the gyro housing to confine the fluid in pockets thereof about each blade of said positioning means, each blade of said partitioning means being provided with a variable sized passage therethrough for permitting leakage of the fluid from and into said chambers through the respective passages in the blades, and means responsive to increases in the temperature of the fluid to position said partitioning blades to decrease said leakage passages and responsive to decrease in fluid temperature to position said partitioning blades to increase said leakage passages.

2. In the gyro of claim 1, said partitioning means including a plurality of longitudinally slidable radially positioned interconnected blade members spaced apart from one another and each being interposed between a pair of said gyro vanes, each of said blades having a slotted portion therein adapted to vary the radial height of the damping fluid leakage passage.

3. In the gyro of claim 2, said temperature responsive means including a gas filled bellows, the outer surface of said bellows being in contact with said fluid, said bellows being longitudinally expandable and contractable in response to variations in volume of the fluid to longitudinally position said partitioning means.

4. In the gyro of claim 3, said partitioning means including a plurality of substantially bar shaped blades each of said blades having a variable slot at radially the outer surface thereof, and cooperating with said housing to provide a substantially U-shaped chamber about each vane.

5. In the gyro of claim 4, said blade members being interconnected and reciprocally slidable in unison relative to said vanes and being spaced therefrom, and said blade members being adapted to provide in cooperation with said housing variably sized fluid leakage passages through said U-shaped chambers, which passages may be varied in area depending upon the longitudinal position of said blades with respect to said vanes.

6. In a single axis fluid damped gyro, a housing for enclosing the gyro and damping fluid and defining a constant width annular recess about the gyro, a plurality of outstanding vanes circumferentially spaced about the gyro and accommodated within said recess, a movable annular ring member about the inside periphery of the housing and provided with a plurality of inwardly extending blades adapted to move transversely into and out of the annular recess through suitable grooves therein, said blades being interspersed with the vanes of the gyro to form chambers about each vane and adapted to contain said damping fluid, said blades being formed with progressively enlarged apertures therein along their length, means responsive to an increase in the volume of the damping fluid for longitudinally positioning said ring member and blades with respect to the annular recess in a direction to decrease the size of the apertured passages formed by the blades falling within said chambers and responsive to a decrease in the fluid volume for positioning said ring and blades with respect to said annular recess to increase the size of the apertured passages formed by the blades falling within said chambers.

7. In the gyro of claim 6, said fluid volume responsive means including a gas filled bellows with a plurality of longitudinally spaced annular convolutions, the outer surface of said bellows being in contact with the damping fluid within said housing.

8. A temperature compensated fluid damping system for a movable mass, comprising a substantially cylindrical housing for containing the mass, an annular recess in said housing having walls substantially normal to the axis of said cylindrical housing defining a passage therein, a fluid filling said passage, a fluid impelling member connected for movement with the mass and disposed within said passage, a reciprocally movable thin wall member of greater dimensions than the cross section of the passage and being positionable to substantially close said passage, said wall being provided with a leakage opening through the wall, with said leakage opening being progressively larger along the length of the wall, and means responsive to the temperature of the fluid for longitudinally positioning said wall with respect to said passage, thereby to vary the size of the leakage opening presented to the fluid passage.

9. In the system of claim 8, a plurality of said fluid impelling members spaced about the mass, and a plurality of said movable wall members, each said wall member being positioned intermediate a pair of fluid impelling members.

10. In the system of claim 9, said wall members being interconnected for movement in unison.

11. A temperature compensated damping means for a rotatable cylindrical member, comprising an outer housing for rotatably supporting the member therein about its cylindrical axis and containing a fluid therein immersing said cylindrical member, a plurality of thin vanes spaced about the cylindrical surface of said cylindrical member, the walls of said housing being spaced from said vanes and forming a continuous annular passage about the cylindrical surface of said member accommodating said vanes, a plurality of parallel arranged elongated blades positioned lengthwise about the cylindrical surface of said member and spaced from one another intermediate said vanes to form separate damping chambers in said passage about each vane, each of said blades having a leakage opening therethrough of progressively varying size along the length of the blades, means interconnecting said blades, and means responsive to the temperature of the fluid for reciprocally positioning said blades in the passage thereby to vary the size of the leakage openings in said chambers about the vanes.

References Cited in the file of this patent

UNITED STATES PATENTS

| | | |
|---|---|---|
| 2,834,213 | Fredricks | May 13, 1958 |
| 2,864,256 | Haagens et al. | Dec. 16, 1958 |
| 2,900,823 | White | Aug. 25, 1959 |